United States Patent
Friederichs

(10) Patent No.: US 12,551,604 B2
(45) Date of Patent: Feb. 17, 2026

(54) ELECTRICAL ISOLATION DEVICES, METHODS AND SYSTEMS

(71) Applicant: NxStage Medical, Inc., Lawrence, MA (US)

(72) Inventor: Goetz Friederichs, Beverly, MA (US)

(73) Assignee: NxStage Medical, Inc., Lawrence, MA (US)

( * ) Notice: Subject to any disclaimer, the term of this patent is extended or adjusted under 35 U.S.C. 154(b) by 452 days.

(21) Appl. No.: 17/922,207

(22) PCT Filed: Jun. 23, 2021

(86) PCT No.: PCT/US2021/038682
§ 371 (c)(1),
(2) Date: Oct. 28, 2022

(87) PCT Pub. No.: WO2021/262851
PCT Pub. Date: Dec. 30, 2021

(65) Prior Publication Data
US 2023/0201431 A1    Jun. 29, 2023

Related U.S. Application Data

(60) Provisional application No. 63/042,738, filed on Jun. 23, 2020.

(51) Int. Cl.
*A61M 1/14*    (2006.01)
*A61M 1/16*    (2006.01)
(Continued)

(52) U.S. Cl.
CPC ............ *A61M 1/14* (2013.01); *A61M 1/1656* (2013.01); *C02F 9/20* (2023.01); *A61M 1/28* (2013.01);
(Continued)

(58) Field of Classification Search
CPC ........ A61M 1/14; A61M 1/1656; A61M 1/28; C02F 1/001; C02F 1/283; C02F 1/32;
(Continued)

(56) References Cited

U.S. PATENT DOCUMENTS 3,648,523 A    3/1972 Kemper et al.
4,310,047 A    1/1982 Branson
(Continued)

FOREIGN PATENT DOCUMENTS

AU    2018236807 A1    4/2019
CN    201755338 U    3/2011
(Continued)

OTHER PUBLICATIONS

Extended European Search Report dated Apr. 23, 2024 for European Patent Application No. 21829395.9.
(Continued)

*Primary Examiner* — John Kim
(74) *Attorney, Agent, or Firm* — Potomac Law Group, PLLC

(57) ABSTRACT

A method of reducing leakage current from a patient to a ground potential through an applied part of a medical device includes defining a maximum permissible leakage current $A_{max}$ from the patient to the ground potential when the patient is energized to an electric potential V and supplying the medical device with water having a resistivity value ρ through a fluid line having a length L and an inner diameter ID. The value of L and ID is selected to cause the fluid conduit filled with water of resistivity ρ to have a resistance of R high enough to maintain the leakage current from the patient to the ground potential below $A_{max}$.

8 Claims, 4 Drawing Sheets

(51) Int. Cl.
*A61M 1/28* (2006.01)
*C02F 9/20* (2023.01)
C02F 1/00 (2023.01)
C02F 1/28 (2023.01)
C02F 1/32 (2023.01)
C02F 1/42 (2023.01)
C02F 1/44 (2023.01)
C02F 103/02 (2006.01)

(52) U.S. Cl.
CPC .............. *C02F 1/001* (2013.01); *C02F 1/283* (2013.01); *C02F 1/32* (2013.01); *C02F 1/42* (2013.01); *C02F 1/444* (2013.01); *C02F 2103/026* (2013.01); *C02F 2209/03* (2013.01); *C02F 2209/05* (2013.01)

(58) Field of Classification Search
CPC .... C02F 1/42; C02F 1/444; C02F 9/20; C02F 2103/026; C02F 2209/03; C02F 2209/05
See application file for complete search history.

(56) References Cited

U.S. PATENT DOCUMENTS

| | | | |
|---|---|---|---|
| 4,614,438 A | 9/1986 | Kobayashi | |
| 4,968,151 A | 11/1990 | Thomson | |
| 5,744,027 A | 4/1998 | Connell et al. | |
| 6,677,859 B1 | 1/2004 | Bensen | |
| 6,827,487 B2 | 12/2004 | Baumbach | |
| 7,306,565 B2 | 12/2007 | Fraden et al. | |
| 7,684,446 B2 | 3/2010 | McLoughlin | |
| 7,789,554 B2 | 9/2010 | Sattler et al. | |
| 7,878,703 B2 | 2/2011 | Roberts | |
| 8,491,184 B2 | 7/2013 | Kamen et al. | |
| 8,764,408 B2 | 7/2014 | Smisson et al. | |
| 8,777,887 B2 | 7/2014 | Jönsson et al. | |
| 8,868,357 B2 | 10/2014 | Huitt et al. | |
| 2004/0007180 A1 | 1/2004 | Yamasaki et al. | |
| 2004/0118202 A1 | 6/2004 | Iwaki et al. | |
| 2004/0155021 A1 | 8/2004 | Norton et al. | |
| 2004/0199114 A1 | 10/2004 | Noda | |
| 2005/0065556 A1 | 3/2005 | Reghabi et al. | |
| 2005/0267698 A1 | 12/2005 | Gordon | |
| 2006/0030917 A1 | 2/2006 | Eccleston et al. | |
| 2007/0095400 A1 | 5/2007 | Bergquist et al. | |
| 2007/0100666 A1 | 5/2007 | Stivoric et al. | |
| 2008/0021377 A1 | 1/2008 | Kienman et al. | |
| 2009/0012454 A1 | 1/2009 | Childers | |
| 2009/0078047 A1 | 3/2009 | Dam | |
| 2010/0009335 A1 | 1/2010 | Joseph et al. | |
| 2010/0084326 A1 | 4/2010 | Takesawa | |
| 2010/0121217 A1 | 5/2010 | Padiy et al. | |
| 2010/0269909 A1 | 10/2010 | Brandl et al. | |
| 2010/0312161 A1 | 12/2010 | Jonsson et al. | |
| 2011/0034866 A1 | 2/2011 | Zhang et al. | |
| 2011/0274138 A1 | 11/2011 | Auret et al. | |
| 2011/0309019 A1 | 12/2011 | Ahrens | |
| 2012/0106589 A1 | 5/2012 | Ozawa | |
| 2012/0203476 A1 | 8/2012 | Dam | |
| 2012/0277673 A1 | 11/2012 | Levin et al. | |
| 2013/0257350 A1 | 10/2013 | Yen | |
| 2013/0310736 A1 | 11/2013 | Hedmann et al. | |
| 2014/0014580 A1 | 1/2014 | Ritter | |
| 2014/0116128 A1 | 5/2014 | Mantinband et al. | |
| 2014/0216560 A1 | 8/2014 | Ambrosina et al. | |
| 2015/0041377 A1 | 2/2015 | Heyes | |
| 2015/0343132 A1 | 12/2015 | Hogard et al. | |
| 2016/0058933 A1 | 3/2016 | Ballantyne et al. | |
| 2017/0290970 A1* | 10/2017 | Friederichs | A61M 1/1672 |
| 2018/0043077 A1 | 2/2018 | Gerber et al. | |
| 2018/0043079 A1 | 2/2018 | Gerber et al. | |
| 2018/0207342 A1 | 7/2018 | Friederichs et al. | |
| 2020/0009308 A1 | 1/2020 | Friederichs et al. | |
| 2020/0171230 A1 | 6/2020 | Brugger et al. | |

FOREIGN PATENT DOCUMENTS

| | | |
|---|---|---|
| EP | 1623733 A2 | 2/2006 |
| EP | 2151673 A2 | 2/2010 |
| EP | 2366419 A1 | 9/2011 |
| IN | 202161616 U | 3/2012 |
| JP | 2009028340 A | 2/2009 |
| JP | 2012011076 A | 1/2012 |
| JP | 2012075572 A | 4/2012 |
| WO | 2011017206 A1 | 2/2011 |
| WO | 2013133050 A1 | 9/2013 |

OTHER PUBLICATIONS

International Search Report and Written Opinion mailed Dec. 2, 2021 for International Patent Application No. PCT/US2021/038682.

Invitation to Pay Additional Fees mailed Sep. 7, 2021 for International Patent Application No. PCT/US2021/038682.

* cited by examiner

ELECTRICAL ISOLATION DEVICES, METHODS AND SYSTEMS

CROSS-REFERENCE TO RELATED APPLICATIONS

This application is a U.S. national stage filing under 35 U.S.C. § 371 of International Application No. PCT/US2021/038682 filed Jun. 23, 2021, which claims priority to and the benefit of U.S. Provisional Patent Application No. 63/042,738 filed Jun. 23, 2020 all of which are hereby incorporated by reference in their entireties.

BACKGROUND

The use of electrically powered medical devices or equipment (ME) connected to a patient is very common in modern medicine. Along with the benefits these devices are designed to bring to a patient, they also can create a potential hazard of electric shock to the patient. Electric shock can be caused by leakage current flowing through the patient's heart, for instance, creating ventricular defibrillation, which a medical device may induce in an earthed patient or sink to earth if the patient is in contact with another source of electricity. Medical equipment is often designed to comply with technical standards. Among such standards, IEC 60601 ("IEC Standard") is a series of technical standards for the safety and essential performance of medical electrical equipment, published by the International Electrotechnical Commission. The IEC 60601-1 Standard is incorporated by reference herein.

The IEC Standard uses the term "applied part" to refer to the part of the medical device which comes into physical contact with the patient in order for the device to carry out its intended function. Applied parts can be classified as Type B, Type BF or Type CF according to the nature of the device and the type of contact. Each classification has differing requirements from the point of view of protection against electrical shock. The IEC Standard specifies safe levels of patient leakage current flowing through patient applied parts of medical devices in no fault and specific fault conditions.

Type CF is the most stringent classification, being required for those applications where the applied part is in direct conductive contact with the heart or other applications as considered necessary. Type BF is less stringent than CF, and is generally for devices that have conductive contact with the patient, or having medium or long term contact with the patient.

The IEC standard defines acceptable limits for leakage current. Leakage current is understood as current that is not functional. The IEC standard addresses earth leakage current, enclosure leakage current, and patient leakage current. It is desirable to design medical equipment to reduce leakage current.

SUMMARY

One or more embodiments of the disclosed subject matter prevent and/or stop unwanted electric current flow (e.g., any current or current above a specified threshold) through a patient via conductive fluid connections between the patient and the medical electrical fluid handling equipment.

Objects and advantages of embodiments of the disclosed subject matter will become apparent from the following description when considered in conjunction with the accompanying drawings.

BRIEF DESCRIPTION OF THE DRAWINGS

Embodiments will hereinafter be described in detail below with reference to the accompanying drawings, wherein like reference numerals represent like elements. The accompanying drawings have not necessarily been drawn to scale. Where applicable, some features may not be illustrated to assist in the description of underlying features.

DETAILED DESCRIPTION

Figure 1A:
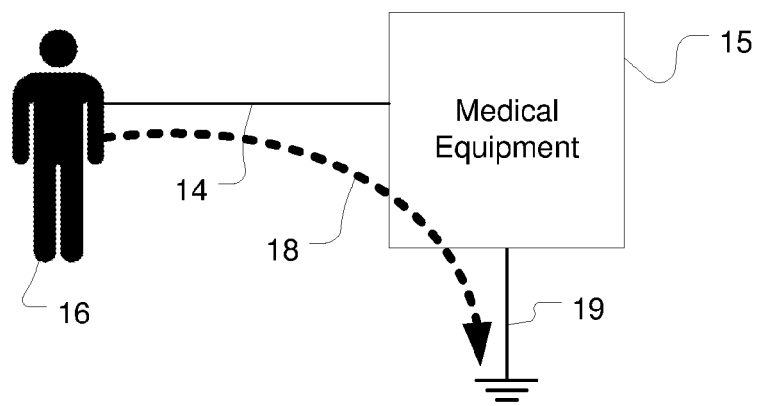
FIG. 1A illustrates schematically a patient connected to medical equipment according to embodiments of the disclosure.

The detailed description set forth below in connection with the appended drawings is intended as a description of various embodiments of the disclosed subject matter and is not intended to represent the only embodiments in which the disclosed subject matter may be practiced. The detailed description includes specific details for the purpose of providing a thorough understanding of the disclosed subject matter. However, it will be apparent to those skilled in the art that the disclosed subject matter may be practiced without these specific details. In some instances, well-known structures and components are shown in block diagram form in order to avoid obscuring the concepts of the disclosed subject matter.

Generally, an aim of one or more embodiments of the disclosed subject matter is to prevent and/or stop unwanted electric current flow (e.g., any current or current above a specified threshold) through a patient via conductive fluid connections between the patient and the medical electrical fluid handling equipment.

Medical electrical equipment or systems may be connected to a patient by one or more non-conductive tubes filled with conductive fluid. Some examples of such equipment or systems include infusion pumps, intravenous pumps, dialysis machines, medical fluid warmers, extracorporeal blood treatment, surgical red blood cell saving, introoperative and post-operative vacuum suction, and donor apheresis machines. The non-conductive tubes connecting these machines to a patient under treatment may become conductors of electricity, especially in the case where the fluids in the tubes have a significant concentration of dissolved ionic species. In some instances, these tubes may be the only electrically conductive connection between the patient and the medical electrical equipment, for example, where the connection to the patient applied part, such as intravenous needle or catheter, is represented by non-conductive tubes filled with conductive fluid creating a path for the patient leakage current. The tubes can couple voltage induced to the fluid from the medical electrical equipment to the patient. If the patient is connected to a grounded hospital bed or any other conductive apparatus, for instance, thereby closing the circuit, potentially harmful electric current can flow through the patient.

In the situation described above, where the patient is coupled to the medical equipment, another possible path to ground is through the medical equipment to a grounded water source. For example, the medical equipment may be fluidly connected to a municipal water supply by tubing or other connections. In some embodiments, the medical equipment includes a water purification function that receives water from a source (such as a municipal water source) and then purifies the water into a purified product water. It will be understood that such the fluid connection from the medical equipment to the water source also creates a conductive connection, as the water in the tubing will create a conductive path. The water in such a water supply is generally considered to at ground potential, thus potentially grounding the patient connected to the medical equipment.

Another potentially dangerous situation can exist when a patient connected to a fluid handling medical device with tubes that are filled with conductive liquid is subject to the influence of an external voltage source, such as a malfunctioning electrical utility device. In such a case, the fluid handling medical device may close the electric circuit by coupling the conductive fluid flowing through the device to the AC Mains ground feeding it. The current flowing through the patient in the above described situations is known as patient leakage current, with allowable patient leakage current values being specified by national and international standards for medical electrical equipment (as discussed above).

Medical fluid handling apparatus functional requirements can dictate the design configurations which may create electrical coupling between a device's electric circuitry and physiological and treatment fluids. In some instances, a medical fluid handling apparatus may be required to provide the fluidic path sterility. To achieve this frequently the fluidic path comprises a sterile disposable, constructed from hard plastic parts and tubing, for instance. These materials are usually good electrical isolators so energy transfer between fluid flowing in the machine and the machine circuitry is frequently only a result of capacitive or inductive coupling.

Embodiments of the disclosed subject matter include systems, methods, and devices that can detect medical electrical apparatus fault(s) and/or external fault(s) that potentially can cause or has/have caused patient leakage current or an unacceptable increase in or amount of patient leakage current flowing in a non-conductive tube or tubes respectively filled with conductive liquid connecting a patient to the medical electrical apparatus.

Referring to FIG. 1A, a patient 16 is receiving treatment from medical equipment 15. Such treatment can include renal replacement therapy (e.g., hemodialysis or peritoneal dialysis) and other treatments that require at least a momentary physical contact between the patient 16 and medical equipment 15 through applied part 14. In embodiments, medical equipment 15 may be a machine that conveys fluids to and/or from patient 16, such as a dialysis cycler or a dialysis-like treatment machine, but the disclosure is not limited to these specific machines. Applied part 14 can be a tube conveying fluid to or from the patient, such as a blood line or a dialysate line, but the applied part 14 is not limited to fluid lines. The applied part 14 may be physically coupled to the patient 16 via a cannula, for example (not explicitly shown). In embodiments the applied part 14 may include one or more data carriers (e.g., wires) that convey electrical signals to or from electrodes on or in the patient.

As illustrated in FIG. 1A, patient 16 is physically connected to applied part 14. This creates an electrical connection between patient 16 and applied part 14. Patient leakage current can be caused by the patient's body being grounded, or held at the electrical ground potential, through applied part 14 and at the same time becoming energized by a source of electrical charge. In such a situation, the electrical charge could pass through the patient to ground 19 as patient leakage current 18 shown in FIG. 1A.

It may be undesirable or unpractical to disconnect the patient from applied part 14 due to the type of treatment being performed. Thus, it will be assumed for purposes of this disclosure that the patient 16 is generally at the same electrical potential as the applied part 14 of medical equipment 15. To avoid or reduce the patient leakage current 18, it is desirable to keep the patient floating, or disconnected from the ground or other source of current at a fixed voltage. When the patient is electrically connected to the applied part 14, it is desirable to keep the applied part 14 floating (i.e., disconnected from the ground).

Figure 1B:
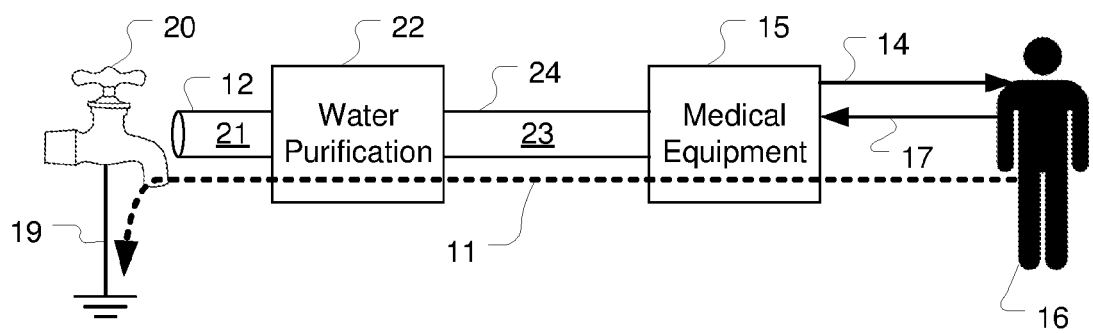
FIG. 1B illustrates schematically a connection between medical equipment and a water purification system according to embodiments of the disclosure.

Referring to FIG. 1B, medical equipment 15 may be configured to receive water or other fluid from an external source, such as water supply 20, which may be a municipal water supply. For example, water 21 from a municipal water supply 20 may be provided to a water purification system 22. It will be assumed that the water supply 20 is at ground potential due to the design of water distribution systems and that water 21 provided by water supply 20 is conductive due to ions and other substances that contribute to conductivity of water. Thus, a conductive path is formed between water purification system 22 and ground 19 through water inlet connection 12 that conveys water 21.

Figure 2:
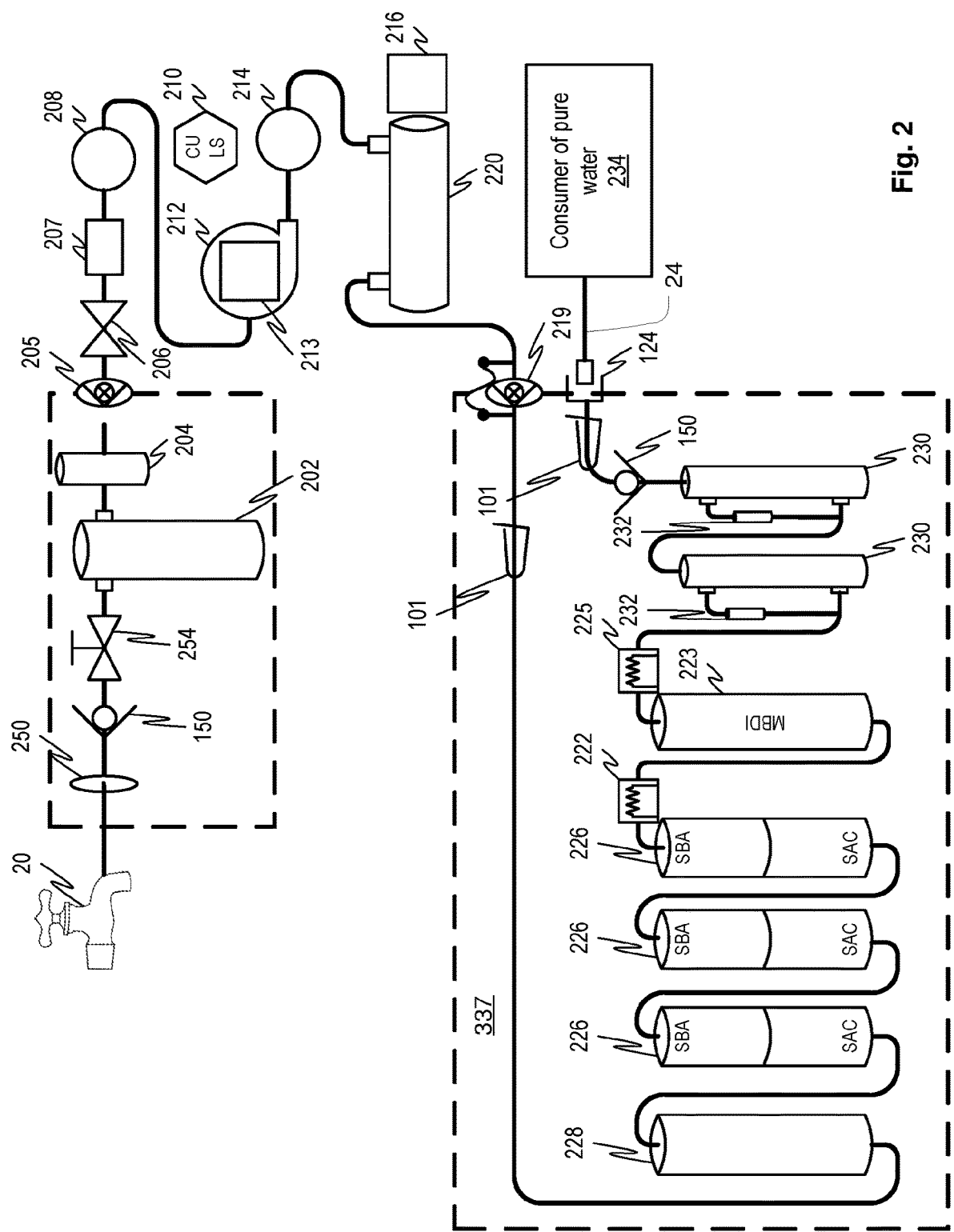
FIG. 2 illustrates a non-limiting example of a water purification system according to embodiments of the disclosure.

The water purification system 22 may purify water 21 into purified water 23. FIG. 2, described below, illustrates an embodiment of water purification system 22, but is not limited to that implementation. The water purification system 22 outputs purified water 23 through a fluid conduit 24 to medical equipment 15. The medical equipment 15 may use the purified water 23 to prepare a medicament that is administered to the patient 16 by applied part 14, which may be a tube or other fluid connection that infuses fluid into the patient 16. As shown in FIG. 1B, the patient may also be connected via a separate fluid line (which is also considered an applied part 17), which withdraws fluid from the patient. In embodiments, the fluid line (designated as 17) may withdraw blood from the patient as part of a hemodialysis treatment or other blood filtration treatments.

If applied part 14 and/or 17 form a conductive connection between the patient 16, then a current path 11 may be formed between the patient 16 and ground 19 through purified water 23, water 21, and municipal water supply 20. This is despite the fact that the medical equipment 15 is floating and not electrically connected to the patient. It is desirable to disrupt this current path 11. One way to disrupt this connection is to introduce a sufficiently high impedance somewhere in the electrical path. In an embodiment, the current path may be disrupted, or reduced, by selecting an appropriate level of purification for purified water 23 and/or controlling the physical characteristics of the fluid conduit 24, to produce a sufficiently high resistance in fluid conduit 24. Another embodiment can detect the presence of patient leakage current in current path 11 and in response to the detection, interrupt the conductive connection from the patient to applied parts 14 and/or 17, as described in U.S. Pat. No. 9,636,454, which is incorporated herein in its entirety.

To help illustrate how the purity of the purified water 23 is controlled, FIG. 2 shows an example of a water purification system 22 that may purify water 21 through deionization and other means. The water purification system 22 has an initial pretreatment stage that includes a connector 250 to connect to an unfiltered water source such as municipal water supply 20 (i.e., a water tap). The water 21 flows through a check valve 150, through a pressure regulator 254, and then through a sediment filter 202. The check valve 150 prevents backflow of the water. The water then flows through an air vent 204 that removes air from the water. The water then flows through a connector 205 that connects to a water shutoff clamp 206, a snubber 207, and a water inlet pressure sensor 208. Water is pumped by water pump 212 which has an encoder 213 for precise tracking of the water pump 212 speed. The snubber 207 reduces pressure fluctuations. The water then flows through a water output pressure sensor 214, through an ultraviolet light lamp 220 and into a filter plant 337 that performs deionization, carbon filtration, and sterilizing filtration. The ultraviolet light lamp 220 can receive power from power controller 216. Water flows from the ultraviolet light lamp 220 through a connector 219, as shown. A combined control unit and leak sensor 210 are provided in the water purification system. In the sterilizing filter plant 337, the water flows through a carbon filter 228 and three separated bed deionization filters 226 which may be resin separated bed filters. The fluid connection from connector 219 to the carbon filter 228 may be provided with a pinch clamp 101 to facilitate replacing the filter plant 337 as a combined unit. A mixed bed deionization filter 223 follows the separated bed filters 226, and is followed by first and second ultrafilters 230 with air vents 232, connecting fluidly to a conduit 24 that connects to the consumer of pure water 234 via connector 124. The medical equipment 15 of FIG. 1B is an example of a consumer of pure water 234.

Between a last separated bed deionization filter 226 and a mixed bed deionization filter 223 is a resistivity sensor 222 which indicates when the deionization resin separated bed filters 226 are nearing exhaustion, or at exhaustion. The deionization resin mixed bed filter 223 is still able to hold a predefined minimum magnitude of resistivity but the deionization resin separated bed filters 226 and the deionization resin mixed bed filter 223 may be replaced at the same time. In embodiments, along with the deionization resin separated bed filters 226 and the deionization resin mixed bed filter 223, the carbon filter 228 and ultrafilters 230 along with the interconnecting lines and other components may also be replaced as a single package. A current treatment can be completed in reliance on the deionization resin mixed bed filter 223 before the exhausted filters are replaced. A further resistivity sensor 225 detects unexpected problems with the deionization separated bed filter 223 upstream deionization filters which may require shutdown of the treatment and immediate replacement of the filters. Note that each of the ultrafilters 230 has an air vent. A check valve 150 is located downstream of the ultrafilters 230. The consumer of pure water 234 may be unit such as that of FIG. 1A which mixes a batch of medicament for use by a medicament user such as a dialysis cycler or any other type of medicament consuming device 15.

It will be understood that water purification system 22 produces purified water 23 which has higher resistivity than water 21. Electrical resistivity (also called specific electrical resistance or volume resistivity) is a property of a material that quantifies how strongly it resists electric current. Resistivity or conductivity of water is a measure of the ability of the water to resist or conduct an electric current. The ability of water to resist or conduct an electric current is directly related to the amount of ionic material (salts) dissolved in the water. Dissolved ionic material is commonly referred to as total dissolved solids or TDS. Water with a relatively high TDS will have a low resistivity and a high conductivity. The opposite is true for water with low TDS. A low resistivity indicates a material that readily allows electric current, while a high resistivity material resists the flow of electric current. The SI unit of electrical resistivity is the ohm-meter ($\Omega \cdot m$). The standard for monitoring the purity of water by electrical resistance is termed specific resistance corrected to 25° C. or R-25. Specific resistance for this purpose is based on the resistance of an electrical current between two 1 cm square plates spaced 1 cm apart as measured at 25° C. The resistivity of water will decrease with an increase in temperature. Conductivity will increase with an increase in temperature. The resistivity of absolute pure water is 18.2 (rounded) $M\Omega \times cm$ at 25° C. or 0.055 micro-siemens/cm. The resistivity of purified water 23 is determined by the water purification system 22. In some embodiments, the resistivity (represented by p) of purified water 23 may be 1 Megaohm-centimeters (1 $M\Omega \cdot cm$). In embodiments, the resistivity is a function of the condition of the resin. An alarm limit can be set to indicate when the resistivity of purified water reaches a predetermined threshold, or the resin can be used for a preset duration. Selecting the particular resin and setting the alarm limit can be adjusted to provide the appropriate level of electrical isolation.

Figure 3:
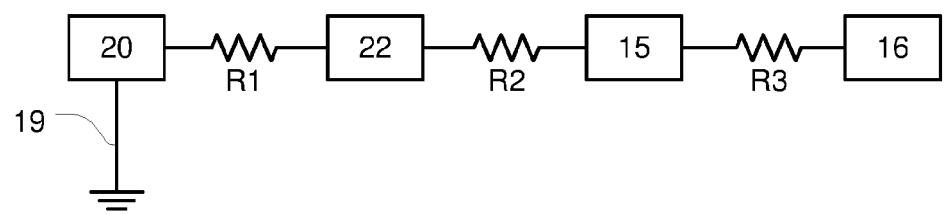
FIG. 3 illustrates an electrical model of the system of FIG. 1B.

FIG. 3 illustrates an electrical model of the configuration of FIG. 1B. Each of the water supply 20, water purification system 22, and medical equipment 15 is illustrated schematically connected in a circuit by resistors R1, R2, and R3. It will be appreciated that R1 represents the effective electrical resistance provided by water inlet connection 12 as it conveys water 21. R2 represents the electrical resistance of fluid conduit 24 conveying purified water 23. R3 represents the electrical resistance of applied parts 14 and 17 physically connected to patient 16. Thus, patient 16 is connected to ground 19 through an electrical connection that has at least the resistive value $Rt=R1+R2+R3$. Embodiments of the disclosure provide an approach for configuring the overall system such that Rt is sufficiently high to effectively disconnect the patient 16 from ground, such that any patient leakage current is below acceptable levels defined by the IEC Standard.

In embodiments, the value of R2 is controlled to be sufficiently high to allow R1 and R3 to be any value, so that the contribution of R2 alone will prevent patient leakage current from exceeding acceptable levels.

Figure 4:
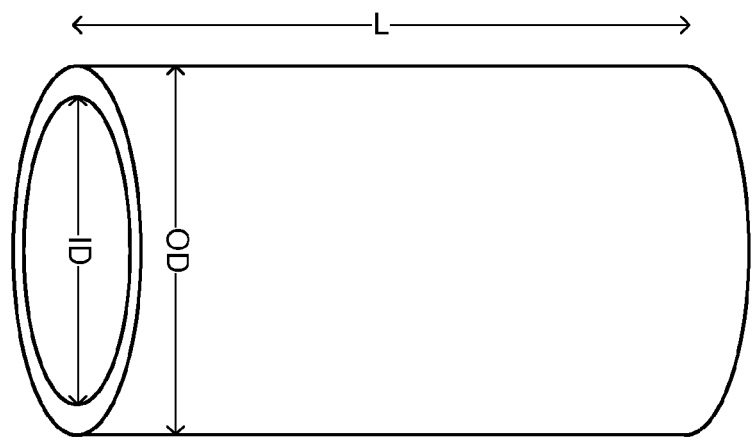
FIG. 4 illustrates a fluid conduit according to embodiments of the disclosure.

Referring to FIG. 4, an embodiment of the fluid conduit 24 is illustrated as a medical grade tube made of a non-conductive material such as plastic or rubber (e.g., polyethylene, EVA, fPVC, HDPE, Nylon, etc.) having an inner diameter ("ID") an outer diameter ("OD") and a length ("L"). In the embodiment of FIG. 4, the tubing is illustrated as having a uniform diameter along the entirety of its length. In other embodiments, other shapes of tubing may be used, such as tubing with a rectangular cross-section, tubing with varying inner dimensions, and/or tubing folded into various shapes.

In FIG. 4, it is possible to effectively break the electrical connection between medical equipment 15 (and thereby patient 16) and ground 19 by selecting the length and the inner diameter of the fluid conduit 24, along with the resistivity of purified water 23, such that fluid conduit 24 can be considered a resistor with the resistance value R2 sufficiently high to prevent unsafe patient leakage current. In the embodiment of FIG. 4, the resistance R2 is given by the formula: R2=ρ(Ω·m)*L(m)/A(m²), where ρ is the resistivity of purified water 23, L is the length of fluid conduit 24 in meters, and A is the cross sectional area of the interior of fluid conduit 24. In FIG. 4, the area of A is given by the standard equation for the area of a circle (πr²), so A=π(ID (m)/2)². Combining these two equations, a formula for the resistance R2 in terms of the inner diameter and L becomes $$R2 = \frac{4\rho L}{\pi ID^2},$$

where ρ is given in Ω·m and L and ID are given in meters.

In an embodiment, it is desirable to keep the patient leakage current flowing through current path 11 below 10 micro-amps (pA) when the patient 16 is energized with a test voltage. The test voltage can be selected based on the supply line voltage in a particular locale, with an additional voltage amount added to represent the worst-case scenario. This additional amount can be 10-30%. For example, in certain locations the line voltage is 120 Volt AC, so the test voltage can be set to be 120V plus 10%, or 132V AC. In other locations, the line voltage is 240 V AC, so the test voltage can be set to 240V plus 10%, or 264V.

The resistivity p of the purified water 23 can be 1 MΩ·cm after it is purified by water purification system 22. In this case, the required value of R2 is 1.5×10⁸ Ohms (or 150 MΩ). With the required value of R2, it is possible to select a value for the inner diameter ID and the length L of the fluid conduit 24. Often, tubing comes is standard diameters, so it is more practical to think in terms of a fixed value of ID, and selecting an appropriate length L to achieve the required value of R2.

Table 1 below provides several additional examples of values of ID and L, with the corresponding resistance value and the leakage current resulting when a test voltage of 132 Volts AC (based on the expected line voltage of 120V) is applied to the patient 16, and R2 is the only resistance between the patient 16 and ground 19.

| Inner Diameter (m) | Length (m) | Resistivity of water (MΩ · cm) | Resistance (MΩ) | Current (μA) |
|---|---|---|---|---|
| 0.01 | 0.1 | 1 | 12.7 | 10.37 |
| 0.01 | 0.2 | 1 | 25.5 | 5.18 |
| 0.01 | 0.3 | 1 | 38.2 | 3.46 |
| 0.01 | 0.1 | 2 | 25.5 | 5.18 |
| 0.01 | 0.2 | 2 | 50.9 | 2.59 |
| 0.01 | 0.3 | 2 | 76.4 | 1.73 |
| 0.01 | 0.1 | 3 | 38.2 | 3.46 |
| 0.01 | 0.2 | 3 | 76.4 | 1.73 |
| 0.01 | 0.3 | 3 | 114.6 | 1.15 |
| 0.0075 | 0.1 | 1 | 22.6 | 5.83 |
| 0.0075 | 0.2 | 1 | 45.3 | 2.92 |
| 0.0075 | 0.3 | 1 | 67.9 | 1.94 |
| 0.0075 | 0.1 | 2 | 45.3 | 2.92 |
| 0.0075 | 0.2 | 2 | 90.5 | 1.46 |
| 0.0075 | 0.3 | 2 | 135.8 | 0.97 |
| 0.0075 | 0.1 | 3 | 67.9 | 1.94 |
| 0.0075 | 0.2 | 3 | 135.8 | 0.97 |
| 0.0075 | 0.3 | 3 | 203.7 | 0.65 |

As shown above, the combination of resistivity, inner diameter, and length provides various resistance values for R2. In the examples above, where the test voltage is 120 V AC, to achieve leakage current at 10.37 μA, the water 23 is purified until it has resistivity of at least 1 MΩ·cm, the inner diameter of fluid conduit 24 is 1 cm, and the length is 10 cm. The length and the inner diameter affect the volume flow rate of water from water purification system 22, and can be set to different values, with a corresponding change in the value of the resistivity to ensure that the leakage current does not exceed a required threshold. It will be appreciated, that the above approach can be used when a different line voltage is expected, to select the appropriate water resistivity, tube diameter, and line length.

When the line voltage is 240 V AC, the test voltage can be 264 V. In this scenario, Table 2 below illustrates the correspondence between the resistivity of the water, tube diameter, and line length.

| Inner Diameter (m) | Length (m) | Resistivity of water (MΩ · cm) | Resistance (MΩ) | Current (μA) |
|---|---|---|---|---|
| 0.01 | 0.1 | 1 | 12.7 | 20.73 |
| 0.01 | 0.2 | 1 | 25.5 | 10.37 |
| 0.01 | 0.3 | 1 | 38.2 | 6.91 |
| 0.01 | 0.1 | 2 | 25.5 | 10.37 |
| 0.01 | 0.2 | 2 | 50.9 | 5.18 |
| 0.01 | 0.3 | 2 | 76.4 | 3.46 |
| 0.01 | 0.1 | 3 | 38.2 | 6.91 |
| 0.01 | 0.2 | 3 | 76.4 | 3.46 |
| 0.01 | 0.3 | 3 | 114.6 | 2.30 |
| 0.0075 | 0.1 | 1 | 22.6 | 11.66 |
| 0.0075 | 0.2 | 1 | 45.3 | 5.83 |
| 0.0075 | 0.3 | 1 | 67.9 | 3.89 |
| 0.0075 | 0.1 | 2 | 45.3 | 5.83 |
| 0.0075 | 0.2 | 2 | 90.5 | 2.92 |
| 0.0075 | 0.3 | 2 | 135.8 | 1.94 |
| 0.0075 | 0.1 | 3 | 67.9 | 3.89 |
| 0.0075 | 0.2 | 3 | 135.8 | 1.94 |
| 0.0075 | 0.3 | 3 | 203.7 | 1.30 |

It can be appreciated that when the test voltage is increased, as shown above, the water resistivity is increased, or the inner diameter is decreased, or the line length is increased (or a combination of more than one of these parameters) to bring the leakage current to acceptable levels.

Figure 5:
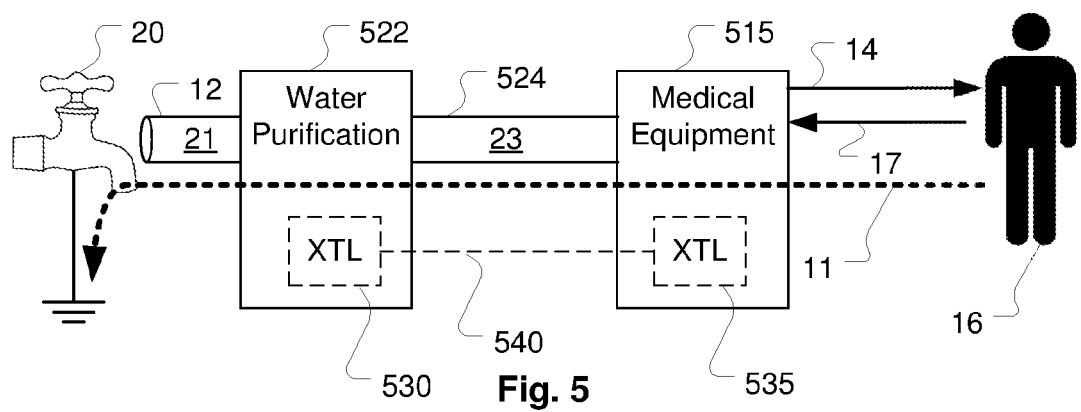
FIG. 5 illustrates schematically a connection between medical equipment and a water purification system according to embodiments of the disclosure.

Referring to FIG. 5, a system similar to that in FIG. 1B is shown. In this embodiment, medical equipment 515 is connected to water purification system 522 by fluid conduit 524. Medical equipment 515 has a controller 535 which is configured to communicate with controller 530 of the water purification system 522. The two controllers are configured to communicate over communication link 540, which may be a wired or wireless connection. Examples of wireless connections include radio frequency communication and optical communication. Although two separate controllers 530 and 535 are shown, in embodiments one of the two controllers may perform the functionality described, without the need for an additional controller.

The controllers 530 and 535 are configured by hard encoding or programming to check whether a sufficient electrical isolation is provided by fluid conduit 524. The water purification system 522 and/or the medical equipment 515 can detect supply line voltage, from which the system(s) determine a test voltage, as described below. Alternatively, or additionally, the line voltage can be an input parameter set by a user. Here, the systems can validate and confirm that the value input by the user matches the line voltage detected.

Based on the line voltage, a desirable resistance value of fluid conduit 524 can be calculated as described above. At this value, the maximum patient leakage current will not exceed a predetermined maximum value (e.g., 10 μA). The resistance value of conduit 524 can then be calculated when the water purification system 522 and the medical equipment 515 generate a known electrical potential difference and measure the resulting current flow. Based on Ohm's law, the resistance value of the fluid conduit 524 is determined, and compared the desired resistance. If the measured resistance is above the desired resistance, purified water 23 can be provided from water purification system 522 to the medical equipment 515. However, if the measured resistance is not above the desired value, the system can output an alert, such as an alarm or a message to a user interface, notifying a user of the situation.

In embodiments, the system may provide information including the inner diameter of fluid conduit 524 to use and/or the minimum length of the fluid conduit 524. A user of the system can then replace fluid conduit 524 with a size and length recommended by the system, and the above resistance verification can be executed again.

In embodiments, the calculated resistance value of fluid conduit 524 may be above the desired resistance value. As described above, the resistance value is dependent on the resistivity of the water produced by the water purification system 522. If the resistivity of the water decreases, the resistance value of the fluid conduit 524 will decrease correspondingly. In an embodiment, the water purification system 522 and/or the medical equipment 515 measures the resistivity value of the purified water 23 that flows through fluid conduit 524. The resistivity can be measured by one or more resistivity sensors (not shown) in water purification system 522 and/or medical equipment 515. The two systems may communicate the resistivity value over communication link 540.

In embodiments, the resistivity of the purified water 23 decreases over time, as the components of the water purification system 522 are used up. The decrease of the resistivity value is detected and tracked, and the resistance value of fluid conduit 524 is correspondingly decreased. When the resistance value of fluid conduit 524 drops below the desired value (which provides sufficient electrical isolation based on the expected maximum line voltage), the system may output alerts and alarms, and stop or suspend operation. In an embodiment, the system outputs information for a user, instructing the user to replace components of the water purification system 522 which increase resistivity of the purified water, and/or to replace the fluid conduit 524 with a tube of increased length and/or decreased diameter. Changing the physical dimensions of the fluid conduit 524 in this manner allows the resistance of the fluid conduit 524 to increase, without the need to replace components of water purification system 522, while continuing to provide electrical isolation.

According to first embodiments, the disclosed subject matter includes a method of reducing leakage current from a patient to a ground potential through an applied part of a medical device. The method includes defining a maximum permissible leakage current $A_{max}$ from the patient to the ground potential when the patient is energized to an electric potential V and supplying the medical device with water having a resistivity value p through a fluid conduit having a length L and an inner diameter ID. A value of L and ID is selected to cause the fluid conduit filled with water of resistivity p to have a resistance of R high enough to maintain the leakage current from the patient to the ground potential below $A_{max}$.

In other examples of the first embodiments, the value of L and ID satisfies a condition defines as $$\frac{V}{A_{max}} \leq \frac{4\rho L}{\pi ID^2}.$$

In still other examples, the method includes fluidly connecting the medical device to the patient with a patient line and conveying medical fluid to or from the patient through the patient line. In still other examples, the method includes fluidly connecting the medical device to a water purification system through the fluid conduit. In still other examples, the method includes fluidly connecting the water purification system to a water source through an input fluid line, flowing source water from the water source to the water purification system, and flowing purified water from the water purification system to the medical device. In still other examples, the input fluid line when filled with the source water has a resistance R1, the fluid line when filled with the purified water has a resistance R2, the patient line when filled with the medical fluid has a resistance R3, and a total resistance of R1+R2+R3 is greater than $V/A_{max}$. In still other examples, V is 1500 Volts, and $A_{max}$ is 10 µA. In still other examples, the resistivity of the purified water is 1 MΩ·cm, the inner diameter of the fluid line is 0.75 cm, and the length of the fluid line is greater than or equal to 0.66 m. In still other examples, the resistivity of the purified water is 3 MΩ·cm, the inner diameter of the fluid line is 0.75 cm, and the length of the fluid line is greater than or equal to 0.3 m. In still other examples, the resistivity of the purified water is 1 MΩ·cm, the inner diameter of the fluid line is 1 cm, and the length of the fluid line is greater than or equal to 1.18 m.

According to second embodiments, the disclosed subject matter includes a medical treatment system. The medical treatment system includes a medical treatment device connected to a patient by an applied part that creates a conductive connection between the patient and the medical treatment device. The medical treatment system also includes a water purification device that is fluidly connected to the medical treatment device with a fluid conduit and fluidly connected to a water source with an input conduit, the water purification device being configured to receive source water having a first resistivity value from the water source and to purify the source water into purified water having a second resistivity value that is greater than the first resistivity value, and to convey the purified water to the medical treatment device. According to embodiments, the water source is at ground potential.

In other examples of the second embodiments, the fluid conduit is a tube having a uniform cross-section of its flow channel with area A and a length L measured from the medical treatment device to the water purification device, and the length L is greater than or equal to $$\frac{(V)(A)}{(I)(\rho)},$$

where V is a maximum expected voltage applied to the patient, A is a cross-sectional area of the flow channel, I is a maximum permitted leakage current from the patient to ground when the patient is connected to the medical treatment device, and p is the resistivity of the purified water. In still other examples, V is 1500 volts, I is 10 microamps, and p is 1 megohm·cm. In still other examples, the flow channel has a circular cross-section with an inner diameter of 0.75 cm. In still other examples, the flow channel has a circular cross-section with an inner diameter of 1 cm. In still other examples, V is 1500 volts, I is 10 microamps, and p is 3 megohm·cm. In still other examples, the flow channel has a circular cross-section with an inner diameter of 0.75 cm. In still other examples, the flow channel has a circular cross-section with an inner diameter of 1 cm. In still other examples, the medical treatment device is a dialysis cycler.

According to third embodiments, the disclosed subject matter includes a method of operating a medical treatment system. The method includes providing a water purifier that purifies source water into purified water with a resistivity value p, supplying the purified water to a medical treatment component through a first fluid conduit, the medical treatment component being conductively connected to a patient. The method also includes detecting physical dimensions of the first fluid conduit and controlling the water purifier to purify the source water until the resistivity value p of the purified water is at least at a first value, wherein the first value is selected based on the physical dimensions of the first fluid conduit and an acceptable value of leakage current from the patient.

In other examples of the third embodiments, the detecting the physical dimensions includes reading a data storage device embedded in the first fluid conduit. In still other examples, the water purifier measures back pressure in the first fluid conduit under a predetermined input pressure to determine the physical dimensions.

According to fourth embodiments, the disclosed subject matter includes a method of reducing leakage current from an object to a ground potential through an applied part of a medical device. The method includes defining a maximum permissible leakage current $A_{max}$ from the object to the ground potential when the object is energized to an electric potential V and supplying the medical device with water having a resistivity value ρ through a fluid conduit having a length L and an inner diameter ID. A value of L and ID is selected to cause the fluid conduit filled with water of resistivity ρ to have a resistance of R high enough to maintain the leakage current from the object to the ground potential below $A_{max}$.

In other examples of the fourth embodiments, the value of L and ID satisfies a condition defines as $$\frac{V}{A_{max}} \leq \frac{4\rho L}{\pi ID^2}.$$

In still other examples, the method includes fluidly connecting the medical device to the object with an object connection line, which may be a hollow fluid tube, and conveying medical fluid to or from the object through the object line. In still other examples, the method includes fluidly connecting the medical device to a water purification system through the fluid conduit. In still other examples, the method includes fluidly connecting the water purification system to a water source through an input fluid line, flowing source water from the water source to the water purification system, and flowing purified water from the water purification system to the medical device. In still other examples, the input fluid line when filled with the source water has a resistance R1, the fluid line when filled with the purified water has a resistance R2, the object line when filled with the medical fluid has a resistance R3, and a total resistance of R1+R2+R3 is greater than $V/A_{max}$. In still other examples, V is 1500 Volts, and $A_{max}$ is 10 µA. In still other examples, the resistivity of the purified water is 1 MΩ·cm, the inner diameter of the fluid line is 0.75 cm, and the length of the fluid line is greater than or equal to 0.66 m. In still other examples, the resistivity of the purified water is 3 MΩ·cm, the inner diameter of the fluid line is 0.75 cm, and the length of the fluid line is greater than or equal to 0.3 m. In still other examples, the resistivity of the purified water is 1 MΩ·cm, the inner diameter of the fluid line is 1 cm, and the length of the fluid line is greater than or equal to 1.18 m.

According to fifth embodiments, the disclosed subject matter includes a medical treatment system. The medical treatment system includes a medical treatment device connected to an object by an applied part that creates a conductive connection between the object and the medical treatment device. The medical treatment system also includes a water purification device that is fluidly connected to the medical treatment device with a fluid conduit and fluidly connected to a water source with an input conduit, the water purification device being configured to receive source water having a first resistivity value from the water source and to purify the source water into purified water having a second resistivity value that is greater than the first resistivity value, and to convey the purified water to the medical treatment device. According to embodiments, the water source is at ground potential.

In other examples of the fifth embodiments, the fluid conduit is a tube having a uniform cross-section of its flow channel with area A and a length L measured from the medical treatment device to the water purification device, and the length L is greater than or equal to $$\frac{(V)(A)}{(I)(\rho)},$$

where v is a maximum expected voltage applied to the object, A is a cross-sectional area of the flow channel, I is a maximum permitted leakage current from the object to ground when the object is connected to the medical treatment device, and ρ is the resistivity of the purified water. In still other examples, V is 1500 volts, I is 10 microamps, and p is 1 megohm·cm. In still other examples, the flow channel has a circular cross-section with an inner diameter of 0.75 cm. In still other examples, the flow channel has a circular cross-section with an inner diameter of 1 cm. In still other examples, V is 1500 volts, I is 10 microamps, and p is 3 megohm·cm. In still other examples, the flow channel has a circular cross-section with an inner diameter of 0.75 cm. In still other examples, the flow channel has a circular cross-section with an inner diameter of 1 cm. In still other examples, the medical treatment device is a dialysis cycler.

It is, thus, apparent that there is provided, in accordance with the present disclosure, leakage current reduction through water path isolation. Many alternatives, modifications, and variations are enabled by the present disclosure. Features of the disclosed embodiments can be combined, rearranged, omitted, etc., within the scope of the invention to produce additional embodiments. Furthermore, certain features may sometimes be used to advantage without a corresponding use of other features. Accordingly, Applicants intend to embrace all such alternatives, modifications, equivalents, and variations that are within the spirit and scope of the present disclosure.

What is claimed is:

1. A method of reducing electrical leakage current that flows from a patient to a water source at a ground potential through an applied part of a medical device that is fluidly connected to the water source via a fluid conduit, the method comprising:

defining a maximum permissible leakage current $A_{max}$ that is permitted to flow from the patient to the water source at the ground potential when the patient is energized to an electric potential V;

selecting a value of length L and inner diameter ID of the fluid conduit to cause the fluid conduit filled with water of resistivity p to have a resistance of R high enough to maintain the leakage current from the patient to the ground potential below $A_{max}$;

fluidly connecting a water purification system to the water source that is at the ground potential;

fluidly connecting the medical device to the water purification system through the fluid conduit having the length L and the inner diameter ID;

fluidly connecting the patient to the medical device with a patient line;

supplying the medical device with purified water having a resistivity value p through the fluid conduit having the length L and the inner diameter ID; and conveying medical fluid to or from the patient through the patient line.

2. The method according to claim 1, wherein the value of L and ID satisfies a condition defined as $$\frac{V}{A_{max}} \le \frac{4\rho L}{\pi ID^2}$$

wherein V is the electric potential of the patient.

3. The method according to claim 1, wherein the fluidly connecting the water purification system to the water source takes place through an input fluid line, and the method further comprises flowing the source water from the water source to the water purification system through the input fluid line.

4. The method according to claim 3, wherein the input fluid line when filled with the source water has a resistance R1, the fluid conduit when filled with the purified water has a resistance R2, the patient line when filled with the medical fluid has a resistance R3, and a total resistance of R1+R2+R3 is greater than $V/A_{max}$.

5. The method according to claim 4, wherein

V is 1500 Volts, and $A_{max}$ is 10 µA.

6. The method according to claim 5, wherein the resistivity value of the purified water is 1 MΩ·cm, the inner diameter of the fluid conduit is 0.75 cm, and the length of the fluid conduit is greater than or equal to 0.66 m.

7. The method according to claim 5, wherein the resistivity value of the purified water is 3 MΩ·cm, the inner diameter of the fluid conduit is 0.75 cm, and the length of the fluid conduit is greater than or equal to 0.3 m.

8. The method according to claim 1, wherein the patient is energized to the electric potential V by a voltage source external to the medical device.

* * * * *